(12) United States Patent
Ohashi et al.

(10) Patent No.: US 11,500,453 B2
(45) Date of Patent: Nov. 15, 2022

(54) INFORMATION PROCESSING APPARATUS

(71) Applicant: Sony Interactive Entertainment Inc., Tokyo (JP)

(72) Inventors: Yoshinori Ohashi, Tokyo (JP); Kazuyuki Arimatsu, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/960,993

(22) PCT Filed: Jan. 30, 2018

(86) PCT No.: PCT/JP2018/002970
§ 371 (c)(1),
(2) Date: Jul. 9, 2020

(87) PCT Pub. No.: WO2019/150430
PCT Pub. Date: Aug. 8, 2019

(65) Prior Publication Data
US 2021/0055784 A1    Feb. 25, 2021

(51) Int. Cl.
*G06F 3/01* (2006.01)
*G02B 27/01* (2006.01)
*G06T 19/00* (2011.01)

(52) U.S. Cl.
CPC .......... *G06F 3/011* (2013.01); *G02B 27/0172* (2013.01); *G06F 3/017* (2013.01); *G06T 19/006* (2013.01)

(58) Field of Classification Search
CPC .......... G06F 3/011; G06F 3/017; G06T 19/20; G06T 19/006
See application file for complete search history.

(56) References Cited

U.S. PATENT DOCUMENTS

| | | | |
|---|---|---|---|
| 6,380,923 B1 | 4/2002 | Fukumoto | |
| 10,466,880 B2 | 11/2019 | Ishino | |
| 2010/0085317 A1* | 4/2010 | Park | G06F 3/04817 715/810 |
| 2012/0313875 A1 | 12/2012 | Kazuyuki | |
| 2015/0220218 A1* | 8/2015 | Jeon | G06F 3/0488 715/825 |
| 2015/0242101 A1* | 8/2015 | Ishino | G06T 7/75 715/776 |
| 2016/0283053 A1* | 9/2016 | Shi | G06F 3/04847 |
| 2017/0060391 A1* | 3/2017 | Jun | G06F 3/0482 |

(Continued)

FOREIGN PATENT DOCUMENTS

| | | |
|---|---|---|
| JP | 7121294 A | 5/1995 |
| JP | 2013003619 A | 1/2013 |
| WO | 2014207971 A1 | 12/2014 |

OTHER PUBLICATIONS

International Search Report for corresponding PCT Application No. PCT/JP2018/002970, 3 pages, dated Apr. 3, 2018.

(Continued)

*Primary Examiner* — Mong-Shune Chung
(74) *Attorney, Agent, or Firm* — Matthew B. Dernier, Esq.

(57) ABSTRACT

Provided is an information processing apparatus that identifies an area of a user's body when the user performs an action of bringing the area of his or her body in contact with a target to be manipulated, and that performs a predetermined process in accordance with the identified area of the body.

5 Claims, 4 Drawing Sheets

(56) References Cited

U.S. PATENT DOCUMENTS

| | | | | |
|---|---|---|---|---|
| 2017/0323483 A1* | 11/2017 | Palmaro | ................. | G06F 3/014 |
| 2017/0330374 A1* | 11/2017 | Horowitz | ................ | G06T 17/10 |
| 2018/0292908 A1* | 10/2018 | Kamoda | ............... | G06T 19/006 |
| 2018/0315243 A1* | 11/2018 | Mahler | .................. | G06F 3/017 |
| 2019/0026950 A1* | 1/2019 | Sawaki | .................. | G06T 19/20 |
| 2019/0087011 A1* | 3/2019 | Kim | ........................ | G06F 3/017 |
| 2019/0147665 A1* | 5/2019 | Banavara | .............. | G06F 3/0304 |
| | | | | 345/419 |
| 2019/0332182 A1* | 10/2019 | Shen | ....................... | G06F 3/017 |
| 2019/0362562 A1* | 11/2019 | Benson | ............. | G06K 9/00671 |

OTHER PUBLICATIONS

International Preliminary Report on Patentability and Written Opinion for corresponding PCT Application No. PCT/JP2018/002970, 11 pages, dated Aug. 13, 2020.

* cited by examiner (a)

(b)

INFORMATION PROCESSING APPARATUS

TECHNICAL FIELD

The present invention relates to an information processing apparatus, an information processing method, and a program that accept a manipulation input produced by a user's body area.

BACKGROUND ART

A touch panel or other input device allows a process associated in advance with an object to be performed as a user makes a tapping action of directly touching the object (target to be manipulated) on a screen. In virtual reality and other fields, on the other hand, technologies are under study for detecting an area of the user's body such as hand fingers and performing a variety of processes in accordance with results of the detection. Such technologies present, to the user, what a virtual space looks like in which the object is arranged, and in the case where the user moves his or her hand or other area of the body over to the position corresponding to the object, a process associated with the object is performed. That is, the user can perform the process associated with the object as that in the example of the touch panel by performing an action of moving his or her body and bringing the body in contact with a virtual object.

SUMMARY

Technical Problems

In the above related technologies, in the case where a plurality of types of processes are associated with an object, the user is unable to give an instruction, to the information processing apparatus, regarding which of the plurality of processes he or she would like to perform by simply touching the object alone. Therefore, the user needs to make another manipulation input for specifying a process type before or after touching the object. However, the need for such a manipulation input makes the manipulation complicated.

The present invention has been devised in light of the foregoing, and it is an object of the present invention to provide an information processing apparatus, an information processing method, and a program that make it possible to give an instruction so that a plurality of processes are performed on a target to be manipulated through a simple manipulation input.

Solution to Problems

An information processing apparatus according to the present invention includes an identification section and a process execution section. The identification section identifies an area of a user's body when the user performs an action to bring the body area in contact with a target to be manipulated. The process execution section performs a predetermined process in accordance with the identified body area.

An information processing method according to the present invention includes a step of identifying an area of a user's body when the user performs an action to bring the body area in contact with a target to be manipulated and a step of performing a predetermined process in accordance with the identified body area.

A program according to the present invention causes a computer to perform a step of identifying an area of a user's body when the user performs an action to bring the body area in contact with a target to be manipulated and a step of performing a predetermined process in accordance with the identified body area. The program may be provided stored in a computer-readable and non-temporary information storage medium.

DESCRIPTION OF EMBODIMENT

A description will be given below of an embodiment of the present invention with reference to drawings.

Figure 1:
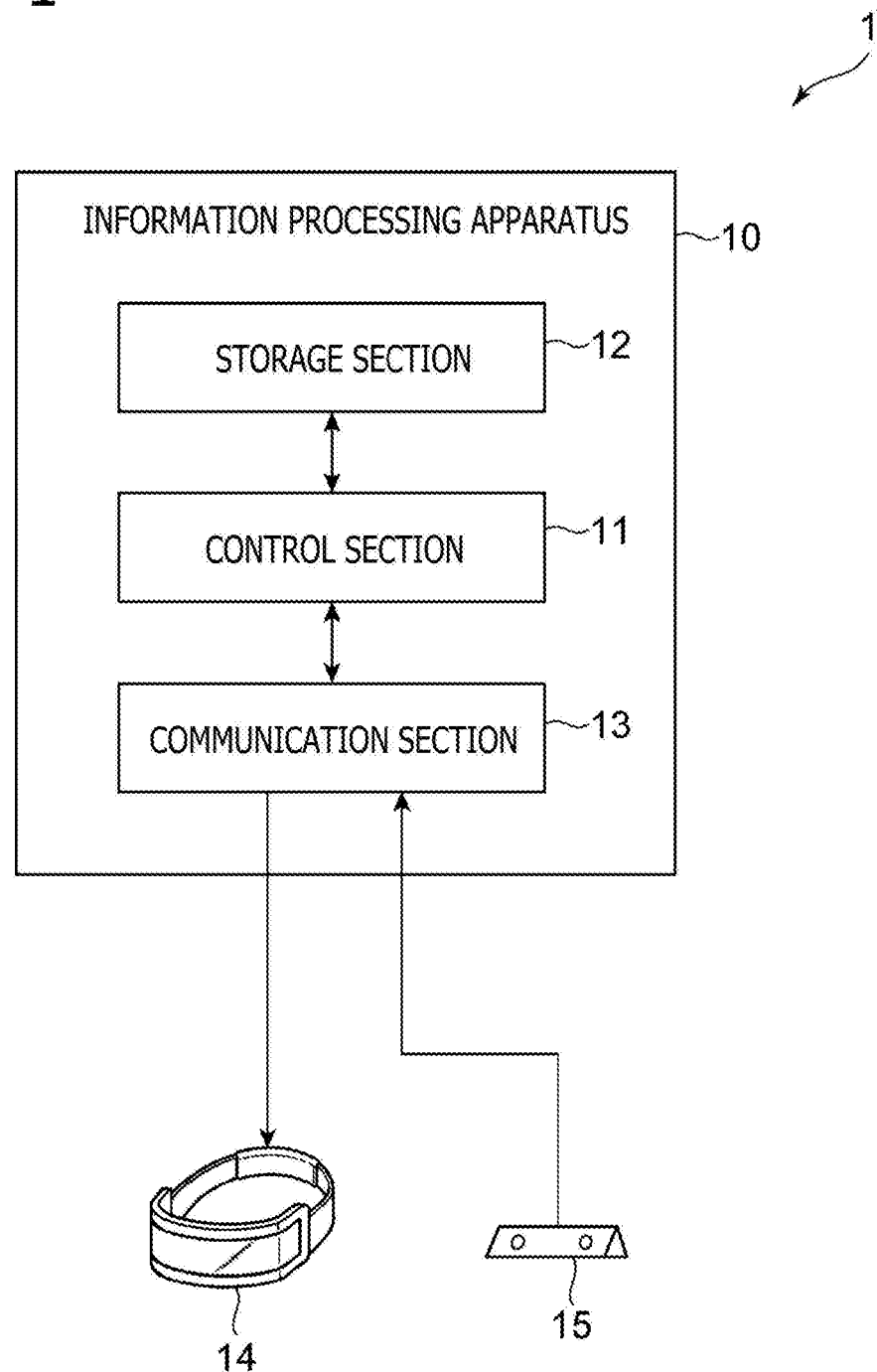
FIG. 1 is a block diagram illustrating an overall configuration of an information processing system including an information processing apparatus according to an embodiment of the present invention.

FIG. 1 is a block diagram illustrating an overall configuration of an information processing system 1 according to an embodiment of the present invention. As illustrated in FIG. 1, the information processing system 1 includes an information processing apparatus 10, a display apparatus 14, and an object sensor 15. The information processing apparatus 10 is, for example, a home gaming console, a personal computer, or other apparatus, and includes a control section 11, a storage section 12, and a communication section 13.

The control section 11 includes at least a processor such as CPU (Central Processing Unit) and carries out a variety of information processing tasks in according with a program stored in the storage section 12. Specific details of the information processing tasks of the control section 11 will be described in detail later.

The storage section 12 includes at least a memory element and holds a program executed by the control section 11 and data processed by the program. This program may be provided stored in a computer-readable and non-temporary storage medium and copied to the storage section 12.

The communication section 13 includes a USB (Universal Serial Bus) or other serial interface or Bluetooth (registered trademark) or other wireless communication interface. The information processing apparatus 10 is connected to each of the display apparatus 14 and the object sensor 15 via the communication section 13 in a wired or wireless manner. Specifically, the communication section 13 sends image data to be displayed by the display apparatus 14 to the display apparatus 14. Also, the communication section 13 receives detection results of the object sensor 15 from the object sensor 15.

The display apparatus 14 displays an image based on an image signal sent from the information processing apparatus 10. We assume here that the display apparatus 14 is a type of device worn on the user's head such as head-mounted display.

The object sensor 15 is used to detect the position of the user's body area. We assume here that the object sensor 15 detects the position of the user's hand. Specifically, for example, the object sensor 15 may be a stereo camera directed to the position where the user's hand is likely to exist. In this case, the object sensor 15 includes two cameras arranged side by side, one on the left and the other on the right, and generates a distance image (depth map) that includes information regarding a distance to a subject that appears within a view field by taking advantage of parallax between the two cameras. The information processing apparatus 10 finds out the position of the user's hand relative to an observation position of the object sensor 15 and the shape of the hand by referring to such a distance image. It is also possible to detect the positions of various objects around the user's hand such as table and wall.

Figure 2:
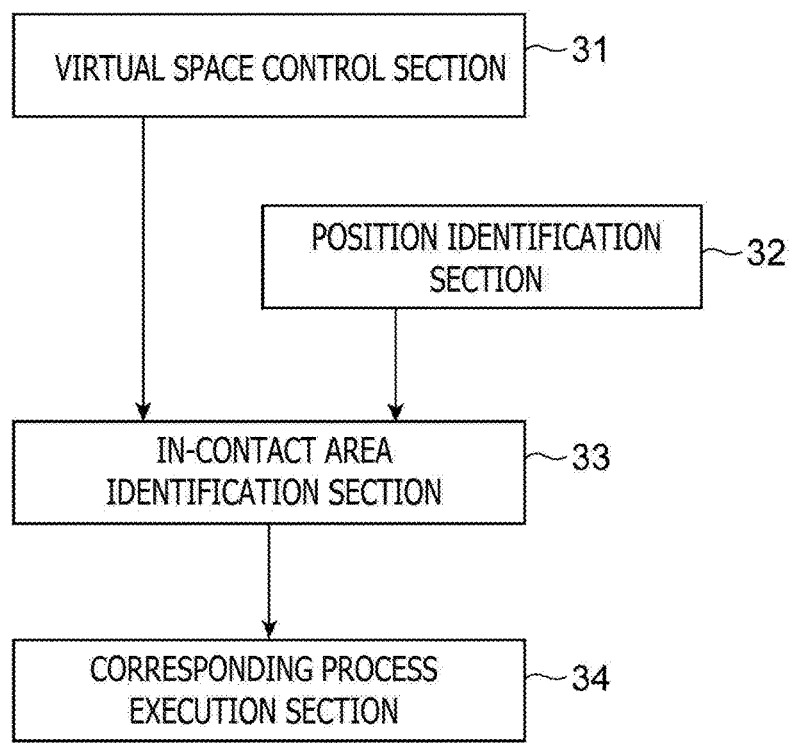
FIG. 2 is a functional block diagram illustrating functions of the information processing apparatus according to the embodiment of the present invention.

A description will be given below of the functions realized by the control section 11 of the information processing apparatus 10. In the present embodiment, the control section 11 functionally includes a virtual space control section 31, a position identification section 32, an in-contact area identification section 33, and a corresponding process execution section 34 as illustrated in FIG. 2. These functions are realized as a result of operation of the control section 11 in accordance with the program stored in the storage section 12. This program may be provided to the information processing apparatus 10 via a communication network such as the Internet or provided stored in a computer-readable information storage medium such as optical disc.

The virtual space control section 31 creates a virtual space and draws an image depicting what the inside looks like. The drawn image is displayed on the display apparatus 14 and presented to the user. Specifically, the virtual space control section 31 creates a virtual space by placing a virtual object to be manipulated by the user (target to be manipulated). Then, the virtual space control section 31 draws an image depicting what the virtual space looks like as seen from a viewpoint position corresponding to the user's eye position and outputs the image to the display apparatus 14.

The position identification section 32 identifies the positions of objects in a detection range of the object sensor 15 and the shapes thereof by using detection results of the object sensor 15. In particular, the position identification section 32 identifies the user's hand position and the positions of objects therearound and the shapes thereof. The identification of the user's hand using detection results of the object sensor 15 can be realized by a known technology. Also, the position identification section 32 recognizes which of the user's left and right hands the identified hand is on the basis of the identified hand shape, the orientation thereof, and so on. Further, the position identification section 32 identifies a finger area included in the hand and recognizes which finger, i.e., thumb, index finger, middle finger, ring finger, or little finger, each finger is.

Further, the virtual space control section 31 places an object corresponding to the user's hand identified by the position identification section 32 (hereinafter referred to as a hand object) in the virtual space. The shape of the hand object mimics the shape of the user's actual hand, and the hand object is placed at a position determined in accordance with the position of the hand in a real-world space identified by the position identification section 32. The placement of the hand object in such a manner allows the user to move the hand object in the virtual space as if his or her hand was in the virtual space.

The in-contact area identification section 33 identifies, in the case where a user's body area comes in contact with the target to be manipulated, the body area on the basis of identification results of the position identification section 32. In the present embodiment in particular, we assume that the user touches the target to be manipulated with his or her hand. Therefore, the in-contact area identification section 33 identifies at least either with which of the left and right hands the user touched the target to be manipulated or with which of the five fingers the user touched the target to be manipulated. Here, the target to be manipulated is provided in the virtual space. Therefore, in the case where the position in the virtual space corresponding to the user's hand position identified by the position identification section 32 overlaps the position of the target to be manipulated, the in-contact area identification section 33 decides that the hand area at the overlapping position has come in contact with the target to be manipulated and identifies that area. That is, in the case where the hand object corresponding to the user's hand comes in contact with the target to be manipulated in the virtual space, it is considered that the user's hand has come in contact with the target to be manipulated.

The corresponding process execution section 34 performs a predetermined process on the target to be manipulated in accordance with the area identified by the in-contact area identification section 33. For example, the corresponding process execution section 34 performs a predetermined process for each hand in accordance with which of the left and right hands the user touched the target to be manipulated with. Such control makes it possible to change what is to be performed as a process between two cases, one where the user touched the target to be manipulated with the left hand and another where the user touched the target to be manipulated with the right hand.

Also, the corresponding process execution section 34 may perform a predetermined process for each finger in accordance with which finger the user touched the target to be manipulated with. Such control allows for the user to give instructions associated with five different actions to the target to be manipulated by selectively using the five fingers. Further, the corresponding process execution section 34 may change what is to be performed as a process by using two pieces of information, that is, with which of the left and right hands the user touched the target to be manipulated and with which of the five fingers the user touched the target to be manipulated. In this case, the corresponding process execution section 34 can perform up to ten different processes in accordance with which of the ten fingers of the left and right hands the user touched the target to be manipulated with. Also, the corresponding process execution section 34 may change what is to be performed as a process in accordance with which area of the finger (fingertip or joint of the bent finger) the user touched the target to be manipulated with. Also, the process corresponding to the area may be also performed in the case where the target to be manipulated is touched with an area other than the fingers such as back of the hand or palm.

Also, the user may simultaneously touch the target to be manipulated with a plurality of body areas. Even in such a case, the corresponding process execution section 34 can change what is to be performed as a process in accordance with which areas of the body the user touched the target to be manipulated with. In particular, the corresponding process execution section 34 may perform, in the case where the user touched the target to be manipulated with the plurality of fingers, a different process in accordance with whether the user touched the target to be manipulated with the fingers of one hand or the fingers of both hands. As described above, a variety of manipulation inputs are possible by identifying each of the plurality of fingers and varying what is to be performed as a process depending on to which hand each finger belongs.

A description will be given below of several specific examples of processes performed by the corresponding process execution section 34 in accordance with the user's body area identified by the in-contact area identification section 33.

Figure 3:
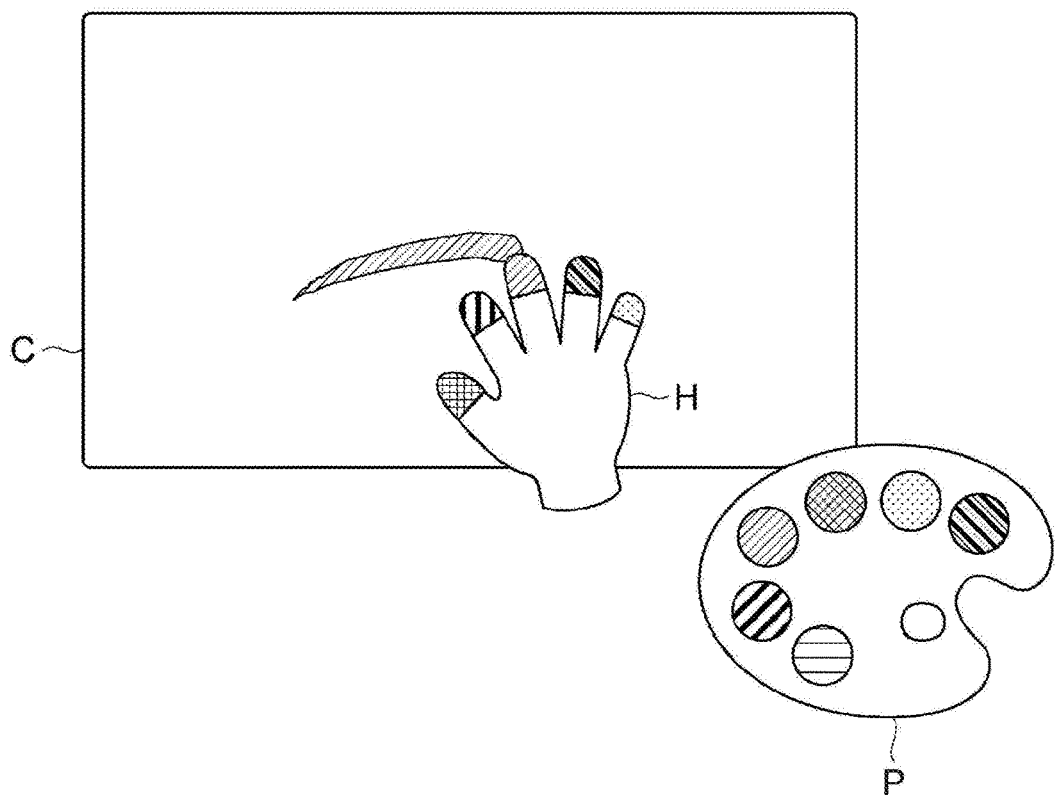
FIG. 3 is a diagram describing a first example of processes performed by the information processing apparatus according to the embodiment of the present invention.

A description will be given first of an example in which a target to be manipulated placed in a virtual space is a canvas and in which the user draws a picture on the canvas by using his or her fingers in place of a brush as a first example. FIG. 3 illustrates what a virtual space looks like in this example in which two types of targets to be manipulated (canvas C and palette P) and a hand object H are provided. In this example, a color is associated with each of the five fingers of the hand object H, and when the user performs a gesture to make a tracing on the canvas C with one of the fingers, the corresponding process execution section 34 draws a line following the path of the finger on the canvas with the color associated with the finger that has touched the canvas C. In this example, the user can draw a picture on the canvas with a variety of colors by selectively using the fingers and without performing any switching between colors separately.

Here, which finger of the user is associated with which color may be determined in advance. However, the user may also make this decision by bringing his or her finger in contact with another target to be manipulated (palette P here) different from the canvas C. Specifically, we assume here that a plurality of colors (six or more colors allowed) are displayed on the palette P and that when the user touches a freely-selected color on the palette P, the color becomes associated with the finger that has come in contact with the color. Once such a condition is established, when the user touches the canvas C with that finger thereafter, drawing is conducted with the color associated with that finger. Also, in the case where a finger with which a color has already been associated is brought in contact with another color on the palette P, the new color that has been touched becomes associated with that finger. In this case, the palette P functions a selection object for presenting a plurality of possible functions (color drawing here) to the user. In the case where one of the user's fingers touches one of the possible functions in the selection object, the possible function is associated with the finger that touched the possible function at that point in time. Such control allows for the user to intuitively assign any functions to the fingers, thus causing the targets to be manipulated to perform a variety of actions.

It should be noted that the function assigned to each of the five fingers of the hand object H may appear on the finger in this example. Specifically, for example, in the case where the user touches one of the colors on the palette P with one of his or her fingers, the corresponding process execution section 34 displays the tip of the hand object H corresponding to the finger in question with the touched color. This makes it possible to readily find out the function assigned to each finger by looking at the hand object H associated with his or her hand.

Further, in this example, the corresponding process execution section 34 may realize the process of drawing a picture on the canvas and erasing the picture in accordance with which of the hands the identified finger belongs. For example, in the case where the user touches the canvas with a finger of the right hand, he or she draws a picture on the canvas with the color associated with the finger as described earlier. On the other hand, in the case where the user touches the canvas with a finger of the left hand, what has been drawn at the touched position is erased. This allows for the user to draw a picture or erase the drawn picture with ease by using both hands. It should be noted that although the erasure process is assigned to a finger of the left hand here, the erasure process may be assigned to one of the fingers of the same hand as that to which the drawing process is assigned.

Figure 4:
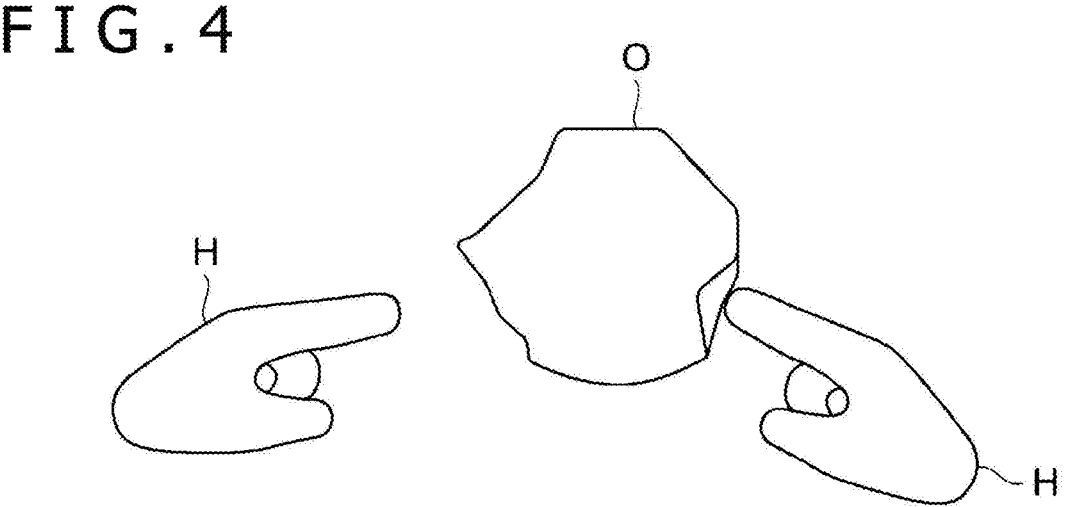
FIG. 4 is a diagram describing a second example of processes performed by the information processing apparatus according to the embodiment of the present invention.

A description will be given of an example in which an action of deforming a three-dimensional object O is performed as a second example. FIG. 4 illustrates what a virtual space looks like in which the three-dimensional object O and the hand object H are provided in this example. In this example, in the case where the user touches a surface of the three-dimensional object O with a finger of the left hand, the surface of the three-dimensional object O bulges at and around the touched position. Conversely, in the case where the user touches the surface of the three-dimensional object O with a finger of the right hand, the surface of the three-dimensional object O dents at and around the touched position. The user can deform the three-dimensional object O with his or her own hand as desired as the corresponding process execution section 34 performs such a process.

Also, although different types of processes regarding the manners in which the three-dimensional object O is deformed are assigned here to the left and right hands, respectively, the present invention is not limited thereto, and a different type of process may be assigned to each finger. For example, the corresponding process execution section 34 may perform a variety of processes such as causing a touched portion of the surface of the three-dimensional object O to bulge, shaving or smoothing the touched surface, and moving the position of a vertex existing on the touched surface along a finger motion in accordance with which finger the user touched the surface of the three-dimensional object O with.

In addition to the above, the corresponding process execution section 34 may perform a variety of processes in accordance with the area of the user's body that came in contact with the target to be manipulated. For example, in the case where the user brings his or her finger in contact with a virtual object such as character or obstacle in a game, various processes may be performed including burning or freezing the virtual object, causing something to emerge at the touched position, and restoring the virtual object to normal in accordance with which finger the user touched the virtual object with. Also, in the case where the virtual object is touched with the right hand, the virtual object may be attracted to the user's hand in the case where the user touched the virtual object with the right hand and repelled from the user's hand in the case where the user touched the virtual object with the left hand.

In the above description, when the user's hand touched a virtual object provided in a virtual space, the corresponding process execution section 34 performed the process corresponding to the body area that touched the virtual object. However, the present invention is not limited thereto, and the target to be manipulated may be an object existing in a real-world space. In this case, the position identification section 32 identifies not only the user's hand shape and position but also the position and shape of the target to be manipulated around the user's hand in the real-world space by using detection results of the object sensor 15. Then, the in-contact area identification section 33 identifies, in the case where a finger of the user's hand comes in contact with the target to be manipulated in the real-world space, which finger has touched the target to be manipulated.

As a specific example, in the case where a table provided in front of the user is a target to be manipulated, the user touches the table with one of the fingers. The in-contact area identification section 33 identifies with which finger the user touched the table, and the corresponding process execution section 34 performs a predetermined process, for example, in accordance with which finger was used and to which of the left and right hands the identified finger belongs. At this time, the virtual space control section 31 may place a virtual object that corresponds in position and shape to the table in the virtual space together with a hand object corresponding to the user's hand.

Further, in this case, the information processing apparatus 10 may be connected not only to the object sensor 15 but also to other types of detection apparatuses to identify the position of the target to be manipulated and the timing when the user's finger touches the target to be manipulated. For example, the user puts on a detection apparatus on the hand to detect the position of an object around the hand and the contact of a finger of the hand with the surrounding object. The information processing apparatus 10 identifies the position of the target to be manipulated and which finger of the user touched the target to be manipulated. Such control allows for highly accurate identification of which finger the user touched the target to be manipulated with in the real-world space and at what timing the user touched the target to be manipulated.

The information processing apparatus 10 according to the present embodiment described above performs a predetermined process in accordance with the body area that touches a target to be manipulated. This makes it possible for the user to readily perform a plurality of types of processes with the information processing apparatus 10.

It should be noted that embodiment of the present invention is not limited to that descried above. For example, although a three-dimensional object provided in a virtual space and an object in a real-world space in the above description are cited as examples of targets to be manipulated, such a target may be a two-dimensional object displayed on screen. In this case, the display apparatus 14 displays an object, a target to be manipulated, on a planar screen.

For example, a target to be manipulated may be a character string displayed on screen. In this case, the user selects a character string to be used as a target to be manipulated by a sliding action on screen with one of the fingers. The corresponding process execution section 34 copies, moves, or deletes the selected character string in accordance with which finger the user selected the character string with. Also, an undoing process of canceling the action of copying, moving, or deleting the character string may be assigned to one of the fingers or a finger of the other hand.

Also, a target to be manipulated may be a two-dimensional object such as image or graphics. In this case, the user performs a variety of processes on the object by touching the screen with a finger or performing a sliding action. Further, in this example, in the case where the user touches the screen with two fingers, what is to be performed may vary depending on whether the user touched the screen with two fingers of one hand or two fingers of two hands. As a specific example, we assume that the user performs an action of sliding the two fingers on the screen and spreading a gap between the fingers. At this time, in the case where the user performs the action in question with one hand, the corresponding process execution section 34 enlarges the entire screen being displayed by performing a zooming process. On the other hand, in the case where the user performs the action in question with fingers of both hands, the corresponding process execution section 34 enlarges the size of the two-dimensional object itself.

Figure 5:
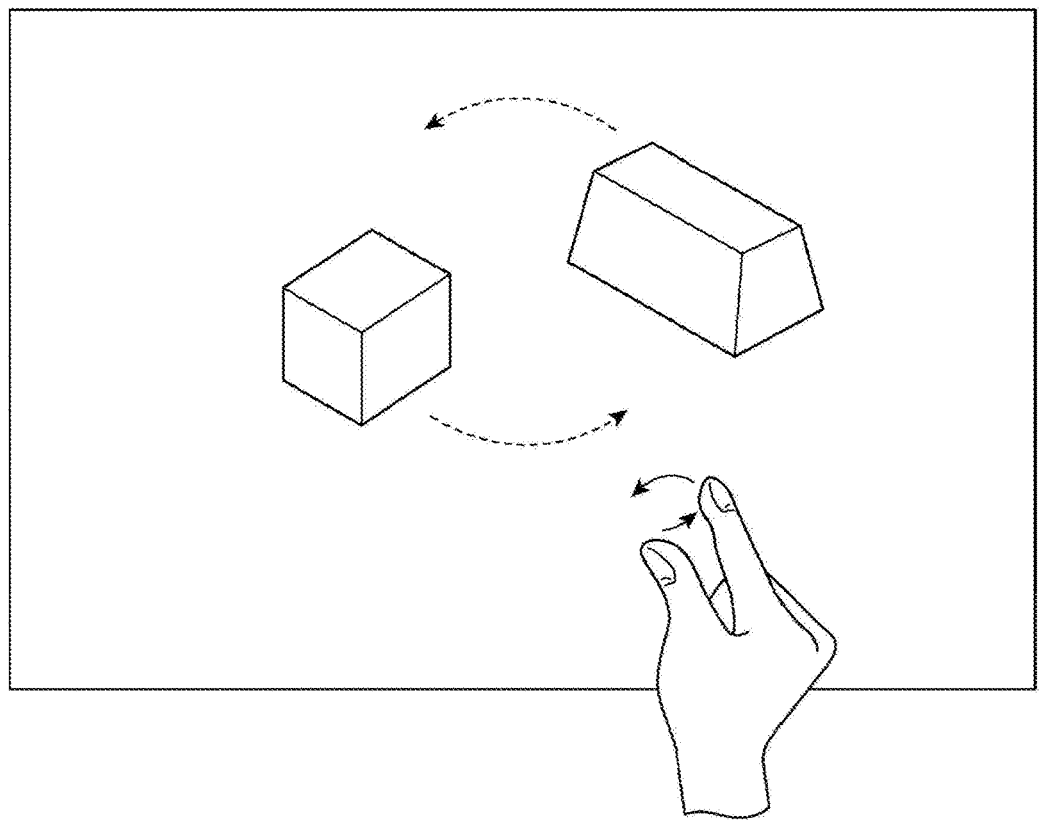
FIG. 5 illustrates diagrams describing examples of processes performed on an on-screen object.
Figure 5:
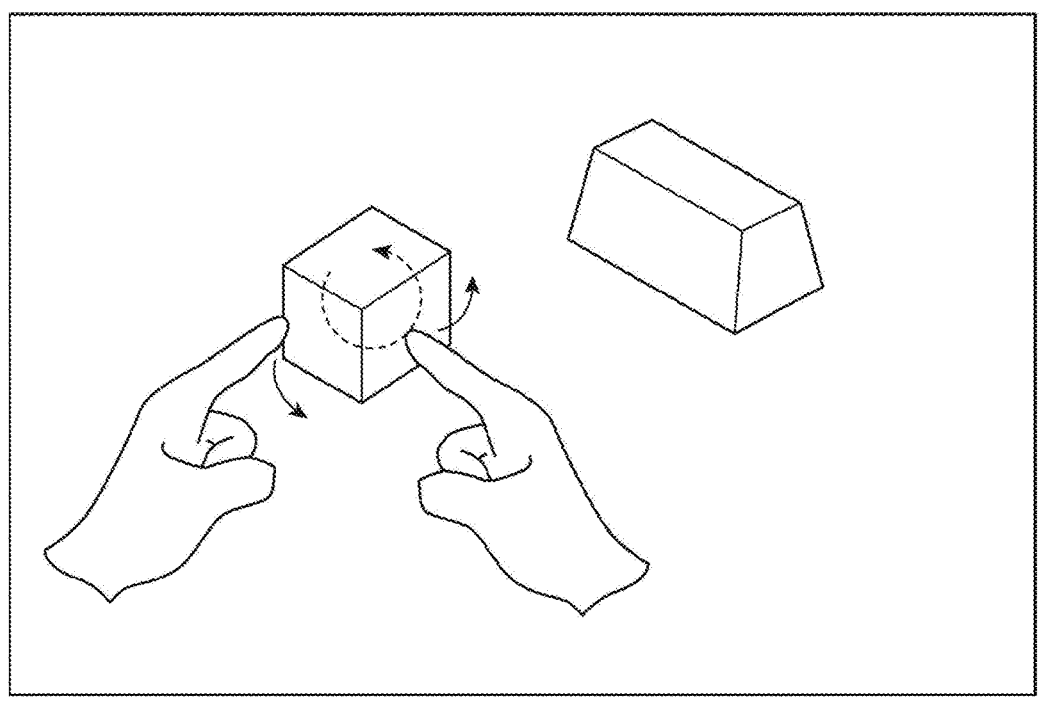

Also, a description will be given of the case where the user performs a rotating action of rotating two fingers on the screen with reference to FIG. 5. FIG. 5(a) illustrates an example of the case where the user performs a rotating action with one hand. It should be noted that the solid line arrows represent motions of the fingers and the broken line arrows represent motions of objects on the screen in FIG. 5(a). Here, the corresponding process execution section 34 rotates an entire display region in accordance with the motions of the user's fingers (view rotation). On the other hand, FIG. 5(b) illustrates an example of the case where the user performs a rotating action with each finger. In this case, the corresponding process execution section 34 rotates the selected two-dimensional object alone. The above control makes it possible to change what is to be performed as a process, for example, in accordance with which finger the user performed the action with and whether the user performed the action with one hand or both hands unlike the case where a user action is accepted by using a conventional multi-touch touch panel or other tool.

Also, although, in the above description, the user brought his or her hand in contact with the target to be manipulated, the present invention is not limited thereto, and the user may bring other area of the body such as head or toe in contact with the target to be manipulated. In this case, the object sensor 15 is capable of detecting the change in motion or posture of a larger portion of the user's body. In this case, the corresponding process execution section 34 performs, in accordance with which area of the user's body touched the target to be manipulated, a process associated in advance with the body area.

Also, in the above description, the position identification section 32 identified the position and shape of the finger of the user's hand by using detection results of the object sensor 15, and the in-contact area identification section 33 identified with which finger the user touched the target to be manipulated on the basis of identification results of the position identification section 32. However, the method by which to identify which area of the body came in contact with the target to be manipulated is not limited to such a technique. The in-contact area identification section 33 may identify the finger that came in contact with the target to be manipulated by a variety of techniques including by using a detection apparatus worn on the user's hand.

REFERENCE SIGNS LIST

1 Information processing system, 10 Information processing apparatus, 11 Control section, 12 Storage section, 13 Communication section, 14 Display apparatus, 15 Object sensor, 31 Virtual space control section, 32 Position identification section, 33 In-contact area identification section, 34 Corresponding process execution section.

The invention claimed is:

1. An information processing apparatus comprising:
an identification circuit having an electronic sensor adapted to electronically identify an area of a user's body when the user performs an action to bring the body area in contact with a target to be manipulated, where the target to be manipulated is a virtual object provided in a virtual space;
a process execution circuit adapted to perform an automated, predetermined process in accordance with the identified body area; and a virtual space control circuit adapted to draw an image depicting what the virtual space looks like in which the virtual object and a body area object corresponding to at least a part of the user's body area in a real-world space are provided, wherein:

the body area includes a user's hand, and the identification circuit is operable to electronically identify which of a left hand, and a right hand, of the user touched the target to be manipulated, the automated predetermined process is different depending on whether the identification circuit identifies the left hand of the user versus the right hand of the user has touched the target to be manipulated, and the identification circuit identifies the area that came in contact when the area object came in contact with the virtual object in the virtual space.

2. The information processing apparatus of claim 1, wherein the body area is one of fingers of the user's hand, the identification circuit identifies with which finger the user touched the target to be manipulated, and the process execution circuit performs a predetermined process for each finger in accordance with which finger the user touched the target to be manipulated.

3. The information processing apparatus of claim 1, wherein the identification circuit identifies whether the user touched the target to be manipulated with one hand or with both hands, and the process execution circuit performs different processes between two cases, one where the user touched the target to be manipulated with one hand and another where the user touched the target to be manipulated with both hands.

4. An information processing method comprising:

employing an electronic sensor to electronically identify an area of a user's body when the user performs an action to bring the body area in contact with a target to be manipulated, where the target to be manipulated is a virtual object provided in a virtual space;

performing an automated, predetermined process in accordance with the identified body area; and drawing an image depicting what the virtual space looks like in which the virtual object and a body area object corresponding to at least a part of the user's body area in a real-world space are provided, wherein:

the body area includes a user's hand, and the employing the electronic sensor includes electronically identifying which of a left hand, and a right hand, of the user touched the target to be manipulated, the automated predetermined process is different depending on whether the identifying identifies the left hand of the user versus the right hand of the user has touched the target to be manipulated, and the electronic sensor identifies the area that came in contact when the area object came in contact with the virtual object in the virtual space.

5. A non-transitory, computer-readable storage medium containing a computer program, which when executed by a computer to carry out actions, comprising:

employing an electronic sensor to electronically identify an area of a user's body when the user performs an action to bring the body area in contact with a target to be manipulated, where the target to be manipulated is a virtual object provided in a virtual space;

performing an automated, predetermined process in accordance with the identified body area; and drawing an image depicting what the virtual space looks like in which the virtual object and a body area object corresponding to at least a part of the user's body area in a real-world space are provided, wherein:

the body area includes a user's hand, and the employing the electronic sensor includes electronically identifying which of a left hand, and a right hand, of the user touched the target to be manipulated, the automated predetermined process is different depending on whether the identifying identifies the left hand of the user versus the right hand of the user has touched the target to be manipulated, and the electronic sensor identifies the area that came in contact when the area object came in contact with the virtual object in the virtual space.

* * * * *